United States Patent
Habas et al.

(10) Patent No.: US 9,143,772 B2
(45) Date of Patent: *Sep. 22, 2015

(54) SYSTEM AND METHOD FOR HANDLING AUDIOVISUAL EQUIPMENT ISSUES

(71) Applicant: Dell Products, LP, Round Rock, TX (US)

(72) Inventors: Andrew G. Habas, Saint Charles, MO (US); Timothy Abels, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/722,381

(22) Filed: Dec. 20, 2012

(65) Prior Publication Data

US 2013/0107058 A1    May 2, 2013

Related U.S. Application Data

(63) Continuation of application No. 11/669,017, filed on Jan. 30, 2007, now Pat. No. 8,363,110.

(51) Int. Cl.
*H04N 17/00* (2006.01)
*G06F 15/177* (2006.01)

(52) U.S. Cl.
CPC .............. *H04N 17/00* (2013.01); *G06F 15/177* (2013.01)

(58) Field of Classification Search
CPC ..................................................... H04N 17/00
USPC .......... 348/180–181, 184, 185, 187, 188–192
See application file for complete search history.

(56) References Cited

U.S. PATENT DOCUMENTS

| | | | |
|---|---|---|---|
| 5,885,214 A | 3/1999 | Monroe et al. | |
| 6,393,379 B1 | 5/2002 | Gumbel | |
| 6,701,364 B1* | 3/2004 | Meyer | 709/224 |
| 6,734,898 B2 | 5/2004 | Zeidler | |
| 6,915,265 B1* | 7/2005 | Johnson | 705/2 |
| 7,106,843 B1* | 9/2006 | Gainsboro et al. | 379/191 |
| 7,275,254 B1 | 9/2007 | Jutzi | |
| 7,306,560 B2* | 12/2007 | Iliff | 600/300 |
| 7,345,700 B2 | 3/2008 | Nortrup | |
| 7,467,198 B2* | 12/2008 | Goodman et al. | 709/223 |
| 7,667,775 B2* | 2/2010 | Kwon et al. | 348/553 |
| 7,889,233 B2* | 2/2011 | Mead et al. | 348/180 |
| 8,363,110 B2* | 1/2013 | Habas et al. | 348/180 |
| 2002/0199132 A1 | 12/2002 | Lachimia et al. | |
| 2003/0145075 A1* | 7/2003 | Weaver et al. | 709/223 |
| 2004/0111326 A1 | 6/2004 | Rock et al. | |
| 2005/0187797 A1* | 8/2005 | Johnson | 705/3 |
| 2005/0253887 A1 | 11/2005 | Garrana et al. | |
| 2006/0149900 A1* | 7/2006 | Terry et al. | 711/114 |
| 2008/0184126 A1 | 7/2008 | Habas et al. | |

* cited by examiner

*Primary Examiner* — Paulos M Natnael
(74) *Attorney, Agent, or Firm* — Larson Newman, LLP (57) ABSTRACT

A system and method for addressing audiovisual equipment issues are disclosed. A system that incorporates teachings of the present disclosure may include, for example, a display device having a housing component at least partially defining an interior space. In some cases, a memory may be fixed within the interior space, and the memory may be storing a first set of display parameters and a second set of display parameters. The system may also include a diagnostic tool located within the interior space. The tool may be operable to assist a user in resolving a display-related issue by engaging in a diagnostic routine that includes a communicative interaction with a remotely located network node.

20 Claims, 4 Drawing Sheets

SYSTEM AND METHOD FOR HANDLING AUDIOVISUAL EQUIPMENT ISSUES

CROSS REFERENCE TO RELATED APPLICATIONS

This application is a continuation of U.S. patent application Ser. No. 11/669,017, entitled "System and Method for Handling Audiovisual Equipment Issues," filed on Jan. 30, 2007, the disclosure of which is hereby expressly incorporated by reference in its entirety.

FIELD OF THE DISCLOSURE

The present disclosure relates generally to audiovisual equipment, and more particularly, to a system and method for addressing audiovisual equipment issues.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Audiovisual (AV) equipment can be part of an information handling system. Audiovisual equipment includes several different classes of equipment. For example, AV equipment can include projectors, displays, monitors, media centers, televisions, media players, media recorders, high definition televisions, speakers, audio equipment, video cameras, video recorders, etc. Given the breadth of AV equipment, it may not be surprising to learn that AV equipment may be found in several different locations. For example, AV equipment may be found in a home, in an office setting, in a movie theater, in a conferencing room, etc.

Whatever form it takes and wherever it may be located, there are occasionally situations in which a user experience with one or more pieces of AV equipment is less than optimal. Perhaps, a component of the AV equipment is behind on maintenance, improperly installed, improperly configured, or at risk of reduced quality during a major event. Identifying potential problems in AV equipment and determining the root cause of those potential problems is often difficult, time consuming, and expensive.

Conventionally, a user of AV equipment waits until a piece of equipment fails, calls a specialist to work on the equipment, and hopes that the specialist can fix the problem in a somewhat timely and cost conscious manner. This conventional technique for resolving audiovisual equipment issues has several shortcomings that are addressed by the following teachings.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

As indicated above, the following description in combination with the Figures is provided to assist in understanding the teachings disclosed herein. The following discussion will focus on specific implementations and embodiments of the teachings. This focus is intended to assist in describing the teachings and should not be interpreted as a limitation on the scope or applicability of the teachings. For example, much of the following discussion focuses on interconnecting a network attached computing platform with a remotely located display device to assist a user of the display device in resolving issues associated with the display device. While the teachings may certainly be utilized in this application, the teachings may also be utilized in other applications, within other computing architectures, and with several different types of AV equipment.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components. AV equipment can be part of an information handling system.

Figure 1:
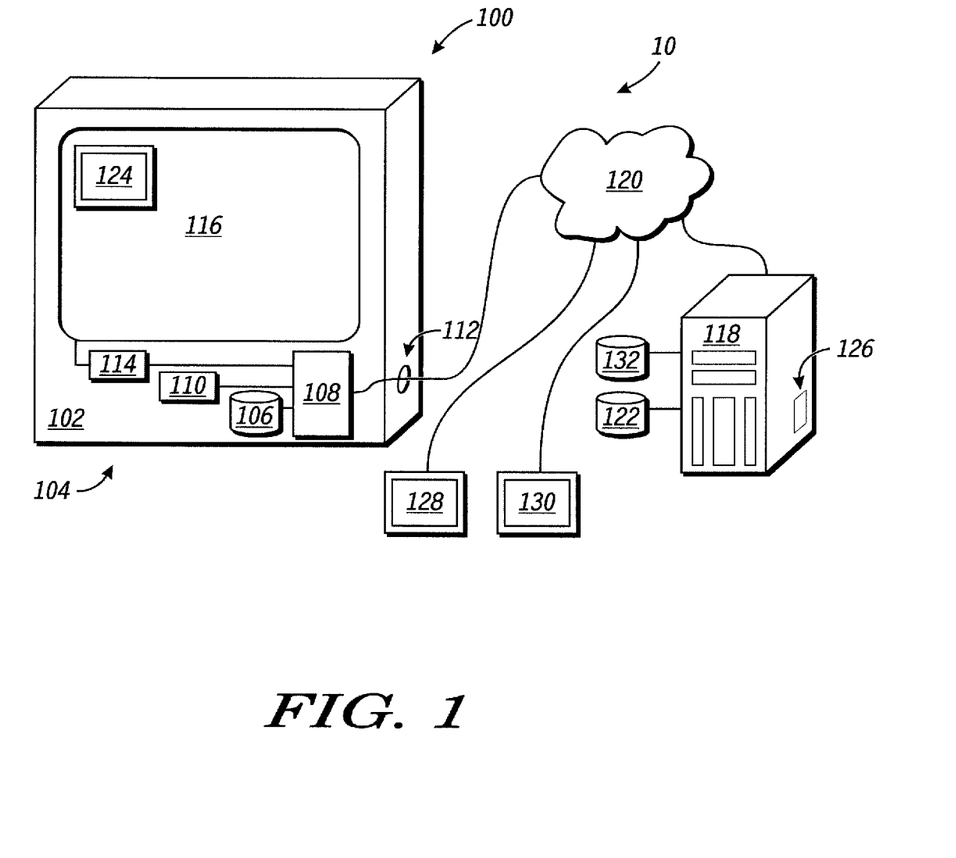
FIG. 1 depicts an audiovisual equipment diagnostic system that incorporates teachings of the present disclosure.

As indicated above, FIG. 1 depicts an information handling system 10 that incorporates teachings of the present disclosure. In a particular embodiment, the information handling system 10 can be an AV equipment diagnostic system. System 10 includes a display device 100 that has at least one housing component 102. In practice, device 100 may include several housing components that interact with one another to help define an enclosure 104 within which may be located several components that assist in the operation of display device 100.

Depending upon implementation detail, display device 100 may be a tube television, a plasma television, an LCD television, a monitor, a projection device, a high definition television, or any other device capable of presenting visual information to a user. Whatever form factor it takes, device 100 may include a memory 106 that stores various pieces of information. Memory 106, like device 100, may take many forms. In some circumstances, memory 106 may be a non-volatile memory such as a ROM device, an NVRAM device, a Flash device, a hard drive, a mini hard drive, etc.

In some implementations, memory 106 may store several pieces of factory installed information such as: as-shipped display settings; as-is settings; optimal AV information and settings; a corresponding diagnostic menu hierarchy with next menu options; as well as associated tests, tools, and recommendations for potential display-related issues. This collection of stored information may assist a user of display device 100 in doing local AV diagnostics and issue resolution directly from device 100. In some cases, memory 106 may also store an address for a network-connected computing resource capable of providing issue resolution assistance in resolving one or more problems that may arise in connection with the use of device 100. These resolutions may include, for example, downloadable system upgrades and instant order options to replace failing equipment or to add new equipment.

Device 100 may also include a computing device 108 that is communicatively coupled to memory 106. Computing device 108 may include a processor with sufficient resources to enable relatively extensive AV diagnostics of device 100. For example, computing device 108 may be capable of accessing a diagnostic tool 110 and utilizing tool 110 to facilitate a user-driven display issue resolution. In practice, tool 110 may be stored in memory 106 and may include computer readable instructions that direct computing device 108 present on-screen and/or on-speaker interfaces for trouble-shooting and resolving display issues. The instructions may also direct computing device 108: to interact with a network connected diagnostic resource; to present a diagnostic graphical user interface; and/or to accept user interactions through one or more interfaces for communicating with device 100, such as on-device buttons, remote controls, local computers, handheld devices, Ethernet interfaces, wireless networking interfaces, and/or RS-232 interfaces.

Device 100 may also be designed to include a specific physical interface, such as network interface 112, for communicating with remote network resources. Device 100 may also be designed to include a display output component 114 that is communicatively coupled to computing device 108 and configured to initiate presentation of information on screen 116.

As indicated above, a diagnostic tool 110 may be located within the interior space of device 100 and may be capable of assisting a user in resolving a display-related issue. In practice, diagnostic tool 110 may launch a diagnostic routine that includes a communicative interaction with a remotely located network node 118. The communicative interaction may be unidirectional and/or bi-directional, and it may be communicated across a network 120 such as the Public Internet.

In some embodiments, node 118 may be a network-connected resource accessible via a web portal and having an Internet Protocol address. Node 118 may be configured to assist a user of device 100 in resolving current and/or potential AV equipment issues. As such, node 118 may have access to a knowledge store 122 that maintains, among other things, known display metrics, known display issues, possible solutions to display issues, and/or updates for tools like diagnostic tool 110. In effect, node 118 in combination with knowledge store 122 may act as a virtual concierge capable of guiding remote users through trouble shooting trees, which may be located in memory 106, may be part of diagnostic tool 110, may be within knowledge store 122, and/or may be somewhere else. The virtual concierge may also guide users in root cause identification, issue resolution, ordering new and/or replacement parts, etc.

As shown in FIG. 1, AV diagnostic information may be presented to a user on screen 116. The presentation may be included, for example, within a GUI element 124. GUI element 124 may present information generated by tool 110 and/or a remote issue resolution tool 126 executing at node 118. Depending upon implementation detail, GUI element 124 may indicate to a user that some diagnostic test is being run or has been run. These diagnostic tests may include a color gamut test, a video signal test, a remote control signal strength test, a video sharpness test, a counting of bulb hours, an audio quality test, a picture improvement test, an aspect ratio test, etc. In some situations, these tests may not require user involvement. In other situations, the user may need to interact with device 100 to answer questions, provide opinions as to AV quality, etc.

Similarly, GUI element 124 may present proposed issue resolution options that include, for example, an invitation to buy a new part, an invitation to alter a display parameter, an invitation to alter an audio parameter, and an invitation to replace an existing part. An invitation to alter a parameter may be presented, for example, if a test indicates that a user might prefer different AV settings. An invitation to buy something may be presented, for example, if one or more diagnostic test indicates that the user's AV equipment has a failed part, a failing part, and/or a suboptimal part. These parts could be, for example, a battery, a software element, a firmware element, a hardware device, a remote control, a digital photo card reader module, a cable, a bulb, a stand, and a speaker.

Figure 2:
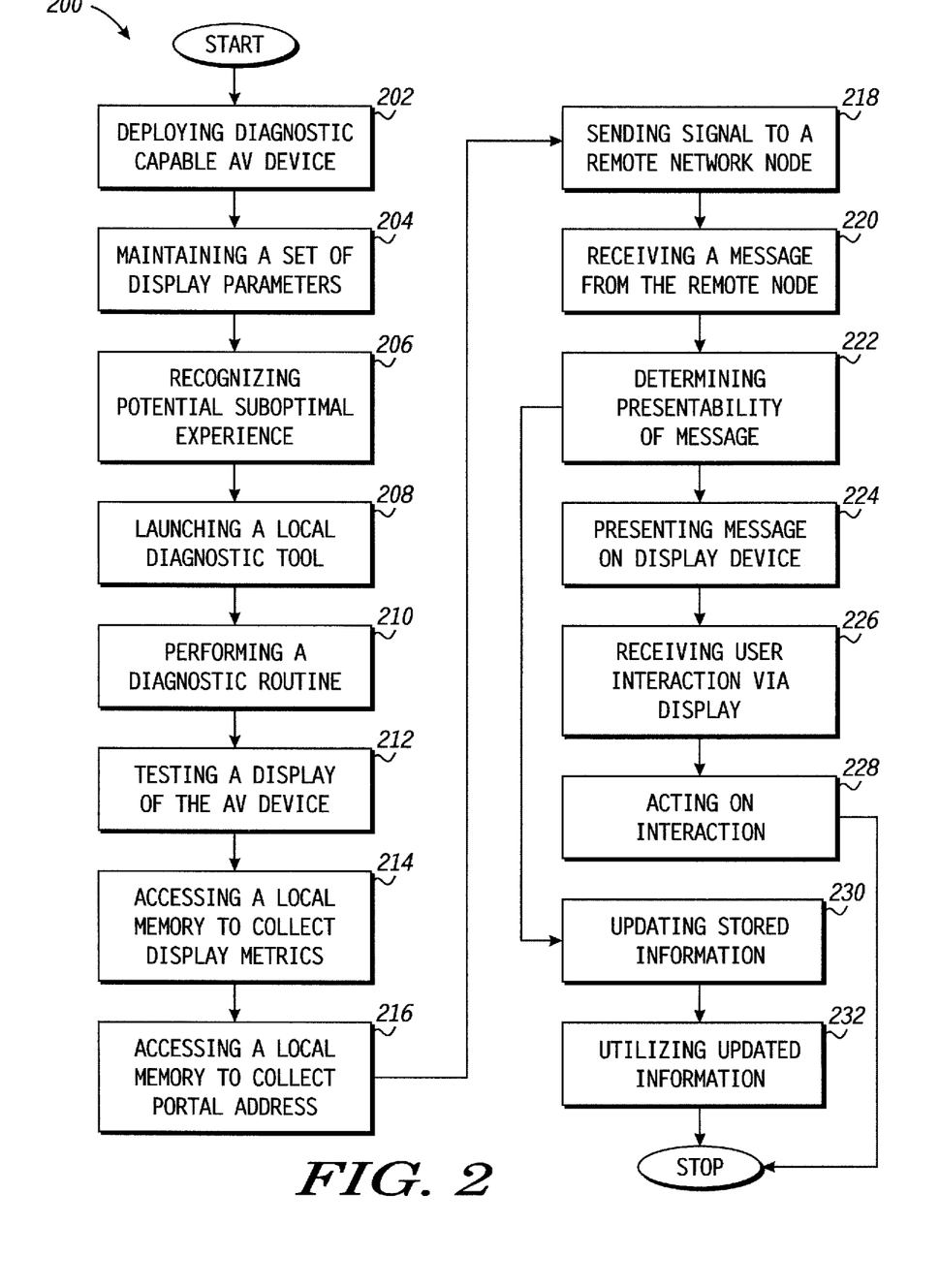
FIG. 2 diagrams a technique for utilizing an AV diagnostic test and tool that enables root cause and resolution analysis in accordance with various teachings disclosed herein.

In the depicted embodiment of FIG. 1, node 118 may support several remotely located AV systems such as system 128 and system 130. As such, node 118 may also be configured such that it has access to a customer data store 132. Data store 132 may maintain various types of customer data. For example, data store 132 may seek to maintain accurate information about the components of system 128 and system 130. Moreover, data store 132 may maintain information about the customers who own systems 128 and 130. This collection of information may assist node 118 in providing accurate and appropriate advice to remote users. The information may also assist node 118 in allowing the remote users to place orders quickly. For example, if a remote user agrees that a new speaker assembly would enhance that users AV experience, the user may want to simply place a 1-click order. In practice, GUI element 124 may present a "Buy Now" icon on display 116. If the user selects the icon and data store 132 maintains sufficient information about the user such as billing and ship to information, node 118 may be capable of processing the order in near real time. Reference to FIG. 2 may assist in further describing the operation of a system like system 10.

As indicated above, FIG. 2 diagrams a technique 200 for utilizing a diagnostic test and tool to identify root causes of various AV issues and to assist in resolving those issues. In practice, technique 200 may begin at step 202 with the deploying of a diagnostic-capable AV device having an associated display. At step 204, at least one set of display parameters may be factory installed within the device. The factory installed display parameters may include, for example, an audio equalizer setting, an aspect ratio, a preset stereo setting, a tint setting, a brightness setting, a sharpness setting, a parental control setting, an on screen display setting, a multi-window display setting, a SAP setting, etc. The factory-installed parameters may be maintained in a memory that may also keep track of the AV device's then-current parameter settings.

At step 206, a potentially suboptimal user experience may be recognized. In practice, the potential problem may be identified in response to some routinely performed diagnostic routines. These routines may be performed at some interval, at power on, at power off, and/or in response to a polling signal received from a remote device. The potential problem may also be identified by the user. For example, the user may feel that a display's color setting is "off" or not quite right. The user may "tell" the display of this concern for example, by pressing a help button on the device and/or its remote. However identified, the potentially suboptimal user experience may be an actual failure with the AV device or it may be a recognition that such a failure is imminent and/or likely.

In response to the recognition, a local diagnostic tool may be launched at step 208. And, a diagnostic routine may be performed at step 210. In practice, the diagnostic routine may involve testing the AV device at step 212. The test may take several forms and may be locally and/or remotely driven. The test may include, for example, a user-driven sound improvement test intended to customize equalization based on viewing location; a channel customization test based on content and attached equipment; a stereo adjustment test to determine appropriate stereo settings; an aspect ratio test, etc. Other example tests include a multi-window mode test to assist in setting parameters such as Picture in Picture and a parental control test to help restore channels that were blocked, add new restrictions based on rating information, and/or to change an access password.

At step 214, a local memory may be accessed to collect "as-is" display metrics and/or factory installed display metrics. At step 216, a memory may be accessed to collect a portal address for accessing a remote network-connected node like node 118 of FIG. 1. At step 218, a signal may be sent to the remote network node at the collected address. The signal may indicate that a local diagnostic routine ran at the AV device and recognized the existence of a potential display related issue. The issue could in some circumstances involve a component failure, a potential component failure, and/or a suboptimal choice of componentry within the AV device. The affected component could be, for example, a battery, a software element, a firmware element, a hardware device, a remote control, a digital photo card reader module, a cable, a bulb, a stand, and/or a speaker. The identified issue may also involve a flawed parameter setting.

Whatever the issue, at step 220, a message may be received from the remote network node. In practice, the received message may include a suggestion for resolving the display-related issue. At step 222, the "presentability" of the message may be determined. For example, some messages may include an invitation to purchase a new piece of equipment. Such a message may be judged presentable and at step 224 a representation of the message may be presented to a user. The user may interact with the message at step 226, and the user's interaction may be acted upon at step 228. For example, if the user elects to buy equipment or to implement a bug fix or parameter change at step 226, the user's election may be implemented at step 228.

In some circumstances, the message received at step 220 may not require user interaction and may be received transparently from the user's perspective. For example, the received message may be an updating and/or altering of stored information that has little or no effect on the user-perceived performance of the AV device. The message may include, for example, an alteration of some diagnostic menu or tool stored at the AV device. In such a circumstance, the updating may occur at step 230 and at step 232 the updated information may be utilized.

Figure 3:
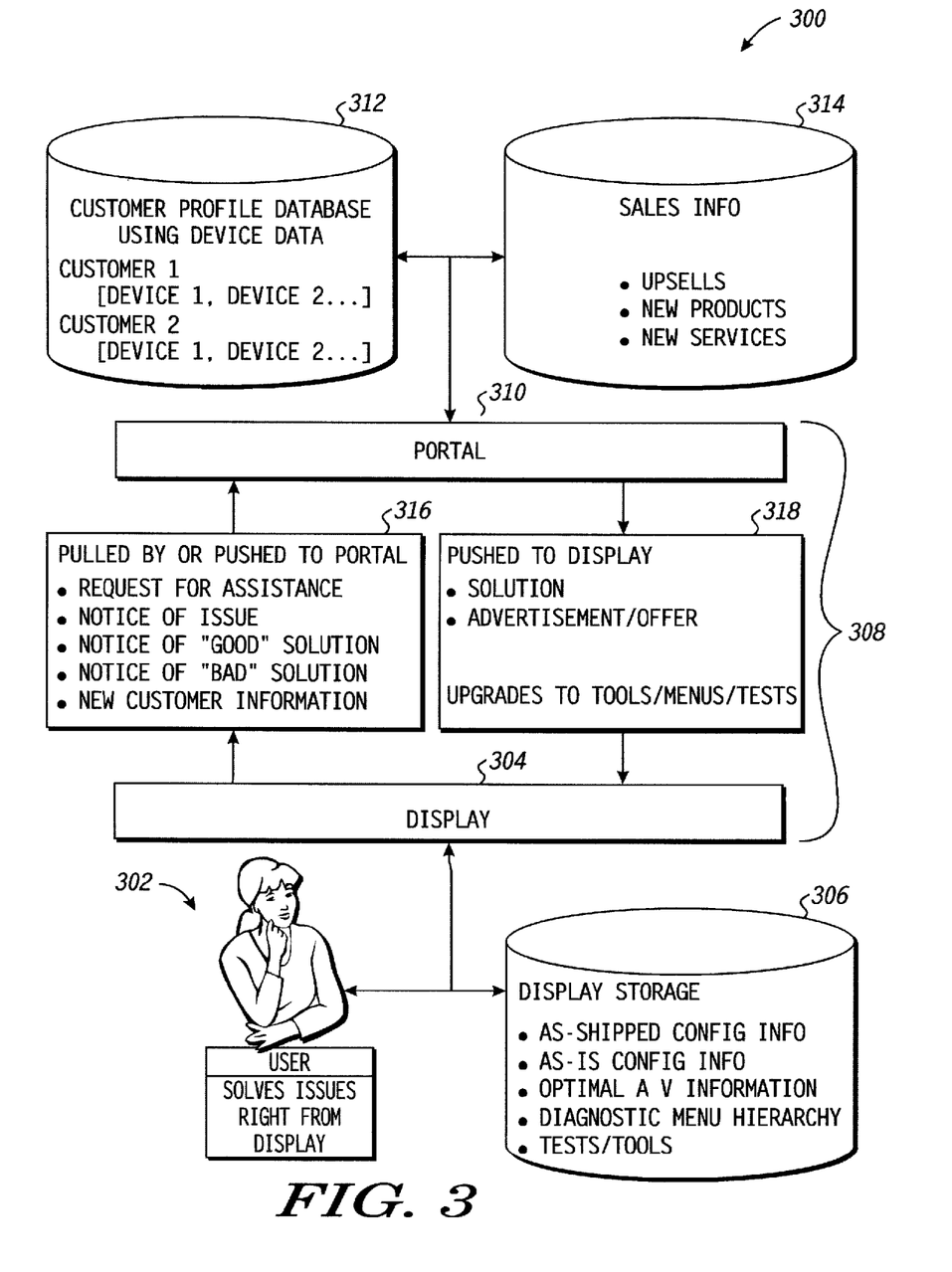
FIG. 3 presents a system for AV issue resolution that includes a web portal architecture enabling remote issue diagnostics and instant sale capabilities in accordance with the teachings disclosed herein.

As indicated above, FIG. 3 presents a graphical representation of a system 300 for AV issue resolution having a web portal architecture that enables remote issue diagnostics and instant sale capabilities in accordance with the teachings disclosed herein. As depicted, a user 302 interacts with a display device 304 and a memory 306 of display device 304 to resolve issues directly from display device 304. As shown, memory 306 maintains "as-shipped" configuration information for device 304 as well as the then-current or "as-is" configuration. Memory 306 also maintains an optimal AV setting as well as diagnostic menus, tests, and tools. These maintained pieces of information allow user 302 to do relatively deep diagnostic analysis and troubleshooting of display device 304 directly from display device 304.

System 300 also includes an interaction represented at 308 between device 302 and a web portal 310. As shown, information stores 312 and 314 reside "behind" portal 310. Store 312 maintains customer profile information such as customer contact and naming information and a listing of customer-owned equipment. Store 314 maintains sales information such as upsell opportunities, new product information, new service information, etc.

In practice, interaction 308 may include either or both of "from device" communication 316 and "to device" communication 318. As shown, communication 316 may be pushed to portal 310 and/or pulled by portal 310. However communicated, communication 316 may be issue related. For example, communication 316 may include a request for assistance in resolving an issue, an indication of an outstanding issue, an indication that a certain resolution worked to resolve a past issue, an indication that a certain resolution did not work to resolve an issue, etc.

Communication 316 may also be informational in nature and may not relate to a specific problem or issue to be diagnosed. For example, communication 316 may simply be an updating of store 312. User 304 may have purchased a new piece of equipment and/or removed an old piece of equipment, and communication 316 may simply let portal 310 know to update store 312.

Similarly, communication 318 may be issue related and/or informational in nature. For example, an issue related communication 318 may be sent to device 302 and may include a proactive and/or responsive issue notification and/or fix. An issue related communication 318 may also include an upgrading of the diagnostic menus and tools stored in memory 306. An informational communication 318 may be an advertisement or upsell attempt.

Figure 4:
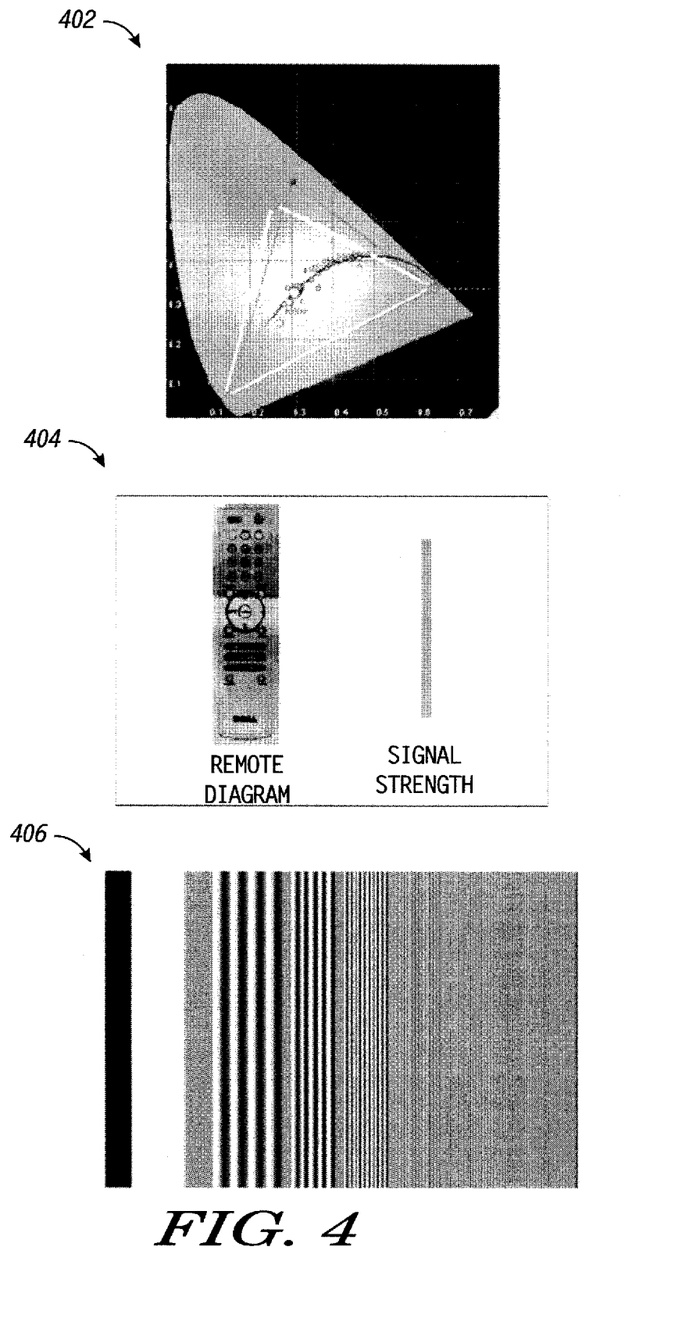
FIG. 4 presents exemplary elements that incorporate teachings of the present disclosure.

As mentioned above in the Brief Description of the Drawings, FIG. 4 presents exemplary testing elements that may be presented to a user, for example, on a display like display 100 of FIG. 1. In practice, a color gamut-testing element 402 may be presented within GUI element 124 to assist a user in adjusting certain display parameters. Similarly, GUI element 124 may also be capable of presenting remote control test element 404 to a user to assist the user in measuring remote control signal strength or remote control settings. Video sharpness element 406 may be used in a similar fashion. After reading the specification, skilled artisans will appreciate that other tests can be performed.

Many different aspects and embodiments are possible. Some of those aspects and embodiments are described below. After reading this specification, skilled artisans will appreciate that those aspects and embodiments are only illustrative and do not limit the scope of the present invention.

In a first aspect, an audiovisual system can include a display device having a housing component at least partially defining an interior space, and a memory fixed within the interior space, the memory storing a first set of display parameters and a second set of display parameters. The audiovisual system can also include a diagnostic tool located within the interior space and operable to assist a user in resolving a display-related issue by engaging in a diagnostic routine that comprises a communicative interaction with a remotely located network node.

In one embodiment of the first aspect, the communicative interaction can include a sending of at least a portion of the first set of display parameters to the remotely located network node. In another embodiment, the communicative interaction can include a receiving of at least one suggestion for resolving the display-related issue. In still another embodiment, the system can further include a stored network address for the remotely located network node. In a particular embodiment, the stored network address can be factory installed.

In a further embodiment of the first aspect, the first set of display parameters can include as-is display configurations, and the second set of display parameters can include as-shipped display configurations. In yet a further embodiment, the diagnostic routine can include a test that includes a color gamut test, a video signal test, a remote control signal strength test, a video sharpness test, or any combination thereof.

In a second aspect, an audiovisual diagnostic system can include a computing device communicatively coupled to a knowledge store, wherein the knowledge store maintaining a first issue resolution option for a first display device issue and a second issue resolution option for a second display device issue. The system can further include an issue resolution tool configured to operate with the computing device to receive an indication of a display device issue from a remotely located display device and to respond to the indication by initiating communication of an issue resolution option maintained in the knowledge store and identified by the issue resolution tool as an appropriate resolution option for the display device issue.

In one embodiment of the second aspect, the computing device, the knowledge store, and the issue resolution tool can be configured as a network based service bureau operable to support a plurality of remotely located display devices. In particular embodiment, the network based service bureau can be accessible via a portal. In a more particular embodiment, the computing device can be communicatively coupled to a database maintaining customer information. In another embodiment, the computing device can be operable to poll a plurality of remotely located display devices, further wherein the indication of the display device issue from the remotely located display device can be received in response to a polling event. In still another embodiment, the indication of the display device issue can be pushed to the computing device by the remotely located display device. In a further embodiment, the computing device can be configured to pull data from the remotely connected display device.

In a third aspect, a device issue resolution method can include receiving a communication from a remote device identifying a device component metric indicative of a potentially suboptimal user experience for a user of the remote device, acquiring a suggested resolution for addressing the potentially suboptimal user experience, and communicating the suggested resolution to the remote device.

In one embodiment of the third aspect, the device component metric can relate to a component part having a type including a battery, software element, a firmware element, a hardware device, a remote control, a digital photo card reader module, a cable, a bulb, a stand, a speaker, or any combination thereof. In another embodiment, the suggested resolution can include an invitation to purchase a component part having a type including a battery, software element, a firmware element, a hardware device, a remote control, a digital photo card reader module, a cable, a bulb, a stand, a speaker, or any combination thereof.

In a further embodiment of the third aspect, the method can further include comparing the device component metric against a collection of known metrics, identifying a listing of possible solutions for the potentially suboptimal user experience associated with device component metric, and selecting the suggested resolution from the listing of possible solutions. In still a further embodiment, the method can further include receiving the communication from the remote device via a portal. In yet a further embodiment, the method can further include receiving the communication from the remote device at a network based service bureau having an Internet Protocol address.

In a fourth aspect, an audiovisual issue resolution method can include initiating communication of an issue resolution request from a display device component in response to an issue recognition signal, the issue resolution request addressed to a remote network node having access to a knowledge store of known resolutions to various display issues. The method can also include receiving a proposed issue resolution.

In one embodiment of the fourth aspect, the method can further include initiating presentation of the proposed issue resolution at the display device. In another embodiment, the method can further include applying the proposed issue resolution to the display device. In still another embodiment, the issue recognition signal can indicate a piece of suboptimal equipment having a type that includes a battery, a remote control, a digital photo card reader module, a cable, a bulb, a stand, a speaker, or any combination thereof. In yet another embodiment, the proposed issue resolution can include an invitation to buy a new part, an invitation to alter a display parameter, an invitation to replace an existing part, an updated diagnostic tool for the display device, or any combination thereof.

In a further embodiment of the fourth aspect, the method can further includes automatically analyzing an operational performance of the display device, recognizing a suboptimal performance characteristic, and outputting the issue recognition signal. In a particular embodiment, the method can further include using the display device to perform each of the steps. In still a further embodiment, the method can further include automatically launching an analysis of at least one operational performance metric of the display device during at least one of a power on sequence and a power off sequence. In yet a further embodiment, the proposed issue resolution includes an invitation to purchase a piece of equipment having a type that includes a battery, a remote control, a digital photo card reader module, a cable, a bulb, a stand, a speaker, or any combination thereof. The method can further include initiating communication of a purchase request for the piece of equipment.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Moreover, terms like "engine," "computing device," "computing platform," "node," etc. are discussed in a manner that includes various pieces and combinations of memory, software, hardware, firmware, etc. And, though various techniques and methodologies are described above as having a given sequence of steps or designated action, these and other techniques incorporating the teachings herein may have various modified, re-ordered, looped, added, deleted, performed by others, etc without departing form the scope of the present invention.

What is claimed is:

1. An audiovisual system, comprising:
   a display device having a housing component at least partially defining an interior space;
   a memory fixed within the interior space, the memory storing a first set of display parameters and a second set of display parameters;
   a data store in communication with display device, the data store to maintain customer information for a user of the audiovisual system; and
   a diagnostic tool located within the interior space, the diagnostic tool operable to assist the user in resolving a display-related issue by engaging in a diagnostic routine that comprises a communicative interaction with a remotely located network node to resolve the display related issue based on the customer information associated with the user maintained at the data store, the diagnostic tool to run a diagnostic routine, to provide a signal identifying a device component metric indicative of a potentially suboptimal user experience for a user of the remote device recognized during the diagnostic routine, to receive an indication to perform a suggested resolution, the suggested resolution being based on the potentially suboptimal user experience, and to resolve the potentially suboptimal user experience with the suggested resolution.

2. The system of claim 1, wherein the communicative interaction comprises a sending of at least a portion of the first set of display parameters to the remotely located network node.

3. The system of claim 1, wherein the communicative interaction comprises a receiving of at least one suggestion for resolving the display-related issue.

4. The system of claim 1, further comprising a stored network address for the remotely located network node.

5. The system of claim 4, wherein the stored network address is factory installed.

6. The system of claim 1, wherein the first set of display parameters comprise as-is display configurations, and the second set of display parameters comprise as-shipped display configurations.

7. The system of claim 1, wherein the diagnostic routine comprises a test selected from a group consisting of a color gamut test, a video signal test, a remote control signal strength test, and a video sharpness test.

8. An audiovisual diagnostic system, comprising:
   a computing device communicatively coupled to a knowledge store;
   the knowledge store maintaining a first issue resolution option for a first display device issue and a second issue resolution option for a second display device issue;
   a data store in communication with computing device, the data store to maintain customer information for a user, wherein the data store is remote from the knowledge store; and
   an issue resolution tool configured to operate with the computing device to receive an indication of a display device issue from a remotely located display device, to respond to the indication by initiating communication of an issue resolution option maintained in the knowledge store and identified by the issue resolution tool as an appropriate resolution option for the display device issue based on the customer information associated with the user being maintained at the data store.

9. The system of claim 8, wherein the computing device, the knowledge store, and the issue resolution tool are configured as a network based service bureau operable to support a plurality of remotely located display devices.

10. The system of claim 9, wherein the network based service bureau is accessible via a portal.

11. The system of claim 8, wherein the information is billing information and shipping information for the user.

12. The system of claim 8, wherein the computing device is operable to poll a plurality of remotely located display devices, further wherein the indication of the display device issue from the remotely located display device is received in response to a polling event.

13. The system of claim 8, wherein the indication of the display device issue is pushed to the computing device by the remotely located display device.

14. The system of claim 8, wherein the computing device is configured to pull data from the remotely connected display device.

15. A device issue resolution method, comprising:
   running a diagnostic routine at a remote device;
   receiving a signal from the remote device identifying a device component metric indicative of a potentially suboptimal user experience for a user of the remote device recognized during the diagnostic routine;
   acquiring a suggested resolution for addressing the potentially suboptimal user experience in response to the signal;
   communicating the suggested resolution to the remote device;
   receiving, at the remote device, an indication to perform the suggested resolution;
   determining that information for the user is maintained at a data store in response to the indication to perform the suggested resolution; and
   resolving the potentially suboptimal user experience with the suggested resolution in response to the information for the user being maintained at the data store.

16. The method of claim 15, wherein the device component metric relates to a component part having a type selected from a group consisting of a battery, software element, a firmware element, a hardware device, a remote control, a digital photo card reader module, a cable, a bulb, a stand, and a speaker.

17. The method of claim 15, wherein the suggested resolution comprises an invitation to purchase a component part having a type selected from a group consisting of a battery, software element, a firmware element, a hardware device, a remote control, a digital photo card reader module, a cable, a bulb, a stand, and a speaker.

18. The method of claim 15, further comprising:
- comparing the device component metric against a collection of known metrics;
- identifying a listing of possible solutions for the potentially suboptimal user experience associated with device component metric; and
- selecting the suggested resolution from the listing of possible solutions.

19. The method of claim 15, further comprising receiving the communication from the remote device via a portal.

20. The method of claim 15, further comprising receiving the communication from the remote device at a network based service bureau having an Internet Protocol address.

* * * * *